United States Patent

Kershaw et al.

[15] 3,696,153

[45] Oct. 3, 1972

[54] HYDROGENATION OF ADIPONITRILE

[72] Inventors: Bernard John Kershaw; Maurice George Pounder; Kenneth Ross Wilkins, all of Brockville, Ontario, Canada

[73] Assignee: E. I. du Pont de Nemours and Company, Wilmington, Del.

[22] Filed: May 7, 1970

[21] Appl. No.: 35,573

[30] Foreign Application Priority Data

July 11, 1969 Canada......................056,835

[52] U.S. Cl...............................260/583 K, 252/459
[51] Int. Cl................................................C07c 85/12
[58] Field of Search....................................260/583 K

[56] References Cited

UNITED STATES PATENTS

| | | | |
|---|---|---|---|
| 3,056,837 | 10/1962 | Steeman | 260/583 K |
| 3,152,184 | 10/1964 | Levering | 260/583 K X |
| 2,956,075 | 10/1960 | Boffa et al. | 260/583 K X |

*Primary Examiner*—Lewis Gotts
*Assistant Examiner*—Richard L. Raymond
*Attorney*—William A. Hoffman

[57] ABSTRACT

Process for the catalytic hydrogenation of adiponitrile at elevated temperatures and pressures in the presence of a catalyst derived from an iron compound in granular form which has been activated with hydrogen at a temperature not exceeding 600° C.

7 Claims, No Drawings

HYDROGENATION OF ADIPONITRILE

The present invention relates to the catalytic hydrogenation of adiponitrile and more particularly to an improvement in the preparation of hexamethylene diamine by the hydrogenation of adiponitrile in the presence of a catalyst with improved service life.

Hexamethylene diamine is a well-known compound which may be prepared continuously on a commercial scale by catalytically hydrogenating adiponitrile in the presence of ammonia. A principal use of hexamethylene diamine involves condensing it with dibasic acids to produce polyamide, and in manufacturing these polyamides, especially those wherein hexamethylene diamine is reacted with adipic acid to produce polyhexamethylene adipamide.

In the continuous production of hexamethylene diamine by the catalytic hydrogenation of adiponitrile, a high purity adiponitrile is necessary; small traces of impurities present may poison the hydrogenation catalyst and so reduce the catalyst's activity and shorten its usable service life markedly. Adiponitrile is frequently synthesized from adipic acid and ammonia in the presence of dehydrating catalysts such as the oxides of phosphorus, silicon, tungsten, titanium, molybdenum and the like. Side reactions occur when adipic acid and ammonia are reacted together resulting in the formation of various impurities. It is these impurities which, if not removed, tend to have a deleterious effect upon the efficiency, yield and life of the hydrogenation catalyst in the subsequent hydrogenation of the adiponitrile to hexamethylene diamine. Before the adiponitrile may be catalytically hydrogenated for commercial production of hexamethylene diamine, thorough purification of the starting materials has thus, in the past, been essential.

Many catalysts have been suggested for the hydrogenation of thoroughly purified adiponitrile. Most frequently, nickel or cobalt or mixtures thereof (usually precipitated upon a finely divided carrier) and also Raney catalysts have been used for the hydrogenation reaction. Iron catalysts made by a melting technique and activated by means of alkali metals have also been suggested. Quite often, the hydrogenation of adiponitrile has been carried out in liquid ammonia in the presence of highly activated nickel or cobalt catalysts at temperatures of between 90°C. and 150°C. If the temperature is raised far above 150°C., formation of underisable hexamethyleneimine is considerably intensified. At temperatures below 90°C., the activity of these conventional catalysts is too low.

The conventional nickel and cobalt catalysts are frequently prepared by dissolving out of aluminum from the aluminum alloys of the metals by means of caustic soda solution or by precipitation of the hydroxides on suitable carriers and subsequent reduction. The production of highly active catalysts is thus difficult, complicated and requires great care.

Although many improvements have been effected in commercial continuous hydrogenation processes for the production of hexamethylene diamine, even the most sophisticated of these processes must be terminated at some time because of detrimental reduction or loss in the ability of the catalyst to aid or effect the required hydrogenation. This loss in catalyst activity occurs regardless of hydrogenation operating temperature at some point of time in the operation of the process dependent upon the operating conditions for the process and the amount of material which has been hydrogenated by any given catalyst as well as other factors.

It is an object of the present invention to prepare hexamethylene diamine by catalytically hydrogenating adiponitrile with the aid of an improved catalyst.

Another object is to provide an improved process for the preparation of hexamethylene diamine by the catalytic hydrogenation of adiponitrile with minimum formation of deleterious by-products such as hexamethyleneimine.

Yet another object is to provide an improved process for hydrogenating adiponitrile to hexamethylene diamine in the presence of a catalyst giving improved yields and service life.

In accordance with the present invention, it has been discovered that these and other objects may be accomplished by hydrogenating adiponitrile under controlled conditions of temperature and pressure in the presence of ammonia and an iron compound in granular form which has been activated by contact with hydrogen at temperatures not exceeding 600°C., said iron compound being capable ultimately of conversion into elemental iron.

Accordingly, the present invention provides a process for the catalytic hydrogenation of adiponitrile in the supercritical vapor phase to hexamethylene diamine at temperatures within the range 100° to 200°C. under superatmospheric pressures in the presence of a catalyst comprising an iron compound in granular form which has been activated by contact with hydrogen at temperatures not exceeding 600°C., said iron compound being capable ultimately of conversion into elemental iron.

When the special catalyst for use according to the present invention is used in a fixed bed it is preferably used in relatively coarse granular form (having a particle size of from about one-tenth to one-twentieth inch). Much finer particle sizes tending to powders may be used if the catalyst is used in a fluid bed or in a slurry-type reactor.

By "super-critical vapor phase" is meant a condition in which the temperature of the reactor is above the pseudocritical temperature of the reactor feed mixture.

The special catalyst for use according to the present invention has been described and claimed in greater detail in an application filed on the same day as the present application by J.R.B. Boocock, F.T. Flood and B.J. Kershaw.

Reference to the copending application will show that it is preferred to activate the catalyst with hydrogen at a temperature between 250°C. and 550°C. Below 250°C., activation proceeds at a rate inadequately fast for most commercial considerations. Activation above 600°C. yields a catalyst of activity inadequate for most practical purposes.

The catalyst may be obtained by reducing an iron oxide such as ferric oxide or ferroso-ferric oxide with hydrogen at temperatures in the range of from 250°C. to 600°C. until such time as the oxygen content of the oxide has decreased to less than 19 weight percent.

In another method the catalyst may be obtained by treating an iron oxide such as ferric oxide or ferroso-ferric oxide with carbon monoxide at temperatures ranging from 200°C. to 450°C., preferably above 325°C., for sufficient time to produce substantial amount of iron carbide and then activating the compound obtained by reducing it with hydrogen at temperatures in the range from 200°C. to 600°C.

For purposes of the present invention, it is preferred to treat iron oxide by heating it at about 400°C. in a furnace under a stream of dry hydrogen for 40 to 50 hours using a relatively high flow rate for the stream of hydrogen. If activation is allowed to proceed for too long a period, sintering of the catalyst may occur. It is desirable that substantially no water be present during the activation treatment. The catalyst prepared in this manner will frequently show surface areas of up to 30 to 35 sq.m./g. which is a substantial improvement in surface area over that of many of the commercially used hydrogenation catalysts.

The process of the present invention is particularly adapted for continuous operation. The temperature of the hydrogenation should be regulated within the range of from 100° to 200°C. and accurately maintained during the continuous reaction by conventional procedures such as the regulation of flow rates and the temperature of the reactants. Temperatures between 105°C. and 165°C. are preferred for practicing the process of the present invention in a continuous manner. Best results are obtained between about 110°C. and 150°C. It is preferred to practice the process of the present invention at about 340 atm pressure.

The process of the present invention may be conducted continuously for many days giving yields of up to 99 percent hexamethylene diamine. It will be appreciated that the degree of purity of adiponitrile used in the process will determine the actual period for which the catalyst remains effective. However, no special need be taken to purge most commercially synthesized adiponitriles of impurities, other than 2-cyanocyclopentylideneimine and moisture, if the adiponitrile contains less than about 1 percent of impurities. (Whilst 2-cyanocyclopentylideneimine has no deleterious effect on the catalyst, its hydrogenation reaction product is extremely difficult to remove from hexamethylene diamine.)

The following Examples help to illustrate the present invention further. All mesh sizes are expressed as U.S. Standard Sieve sizes.

EXAMPLE 1

The following will compare the process of the present invention with a process of the prior art using a conventional commercially available cobalt oxide catalyst.

IRON CATALYST (A)

16.8 lb. moles of iron oxide (containing about 3 percent by weight of alumina) having particle sizes from 0.055 to 0.093 inches were charged into a cartridge tube having a diameter of 16 inches. The cartridge was then inserted into a heater shell and pressurized to 90 psi with nitrogen. The iron oxide was then heated to 350°C., over a period of 3 hours, using preheated nitrogen. The nitrogen flow was stopped and replaced by a dry hydrogen flow of 92 lb. moles per hour that had been preheated to 500°C.; the temperature of the iron oxide increased to 460°C. This activation treatment was continued for a further 48 hours and the product so obtained was allowed to cool to 100°C. under hydrogen. Then the hydrogen flow was stopped and replaced by a stream of nitrogen until the product had reached ambient temperature so yielding the iron catalyst.

COBALT CATALYST (X)

Seven hundred and thirteen parts of cobalt oxide, in the form of one-eighth inch pills, were divided into four approximately equal portions, each of which was placed in a furnace tube. Each portion was heated in a stream of 167 volume parts per minute of helium to 250°C. Hydrogen was then added to the gas stream at a rate of 17 volume parts per minute. After a further 2 hours the temperature was increased to 350°C. and the hydrogen flow to 40 volume parts per minute. The temperature was further increased to 400°C. and the hydrogen flow was gradually increased over a period of 4 hours to 167 volume parts per minute. After a further 15 minutes the helium low was decreased to 50 volume parts per minute and the reduction allowed to continue for a further 24 hours. The hydrogen flow was then decreased to 80 volume parts per minute and the product allowed to cool to ambient temperature. The four portions were combined for use as the catalyst.

The following table sets out the operation conditions and results of two runs, the first with the reactor charged with cobalt catalyst (X) and the second with the reactor charged with iron catalyst (A).

TABLE 1

| Run No. | (1) | (2) |
| --- | --- | --- |
| Catalyst | Cobalt (X) | Iron (A) |
| Particle size | 1/8 in. pills | 8–14 mesh crushed |
| Catalyst weight | 400 gm. | 439 gm. |
| Reactor pressure | 340 atm. | 340 atm. |
| Flow direction | up flow | up flow |
| Reactor Bed Temperatures | | |
| Inlet | 98°C. | 105–110°C. |
| Mid point | 125–131°C. | 121–145°C. |
| Top | 134–142°C. | 142–145°C. |
| Feed Rates Adiponitrile | 485 gm/hr. | 416–471 gm/hr. |
| $NH_3$ | 3115 gm/hr. | 2470–2735 gm/hr. |
| $H_2$ | 79 std. ft³/hr. | 77–84 std.ft³/hr. |
| Product Analysis (Molar Composition) | | |
| Hexamethylene diamine | 96.4% | 98.8% |
| Over conversion products | 1.2% | 0.8% |
| Under conversion products | 1.7% | 0 |
| Other | 0.7% | 0.4% |
| Productivity lb./hr. diamine produced per cu. ft. of catalyst | 148 | 135–147 |
| Total weight of Adiponitrile fed—throughput | 8800 gm. | 51000 gm. |
| Catalyst activity at end of run | low | high |

These results indicate that a significant increase in hexamethylenediamine yield and in catalyst life as measured by throughput at the same productivity is attained by the use of iron catalyst instead of cobalt catalyst.

EXAMPLE 2

A variety of reduced iron oxide catalysts was evaluated to show that the performance observed with the iron catalyst of Example 1 may be maintained with different species — all of which were fused. The conditions used and results obtained from pilot plant evaluations are given below:

TABLE 2

| Run No. | (1) | (2) | (3) |
|---|---|---|---|
| Iron Catalyst | A | B | C |
| Particle size-crushed | 8×14 mesh | 8×14 mesh | 8×14 |
| Catalyst weight | 439 gm. | 385 gm. | 511 gm. |
| Reactor pressure | 340 atm. | 340 atm. | 340 atm. |
| Flow direction | up flow | up flow | up flow |
| Reactor Bed Temperatures | | | |
| Inlet | 105–110°C | 107–117°C | 108–119°C |
| Mid point | 121–145°C | 130–158°C | 125–182°C |
| Top | 142–145°C | 145–155°C | 148–162°C |
| Feed Rates Adiponitrile | 416–471 gm/hr. | 397–515 gm/hr. | 436–561 gm/hr. |
| $NH_3$ | 2470–2735 gm/hr. | 2169–3252 gm/hr. | 2350–3038 gm/hr. |
| $H_2$ | 77–84 std. cu.ft/hr. | 72–74 std. cu.ft/hr. | 81–87 std. cu. ft/hr. |
| Product Analysis | | | |
| Hexamethylene diamine | 98.8% | 97.7% | 97.7% |
| Over Conversion products | 0.8% | 0.8% | 0.5% |
| Under Conversion products | 0 | 0 | 0.1% |
| Others | 0.4 % | 1.5% | 1.7% |
| Productivity lb/hr. diamine produced per cu.ft. of catalyst | 135–147 | 121–159 | 133–163 |
| Total weight of adiponitrile fed—throughput | 51000 gm. | 40500 gm. | 43300 gm |
| Catalyst activity at end of run | high | high | high |

The 1.1 percent difference in hexamethylene diamine yield indicated between Run (1) and the other two Runs results from the presence of 0.2 percent water in the ammonia used in the other two Runs. In Run (1) the water content of the ammonia was less than 0.01 percent. Catalyst (B) used in the above Example was a catalyst similar to Catalyst (A) except that it contained 5 percent by weight of alumina. Catalyst (C) used in the above Example was obtained by activating an iron oxide occuring naturally in Labrador.

The embodiments of the invention in which an exclusive property or privilege is claimed are defined as follows:

1. A process for the catalytic hydrogenation of adiponitrile in the super-critical vapor phase to hexamethylene-diamine at a temperature within the range of 100°C. to 200°C. under superatmospheric pressures in the presence of ammonia and a catalyst comprising substantially elemental iron in granular form, prepared by contacting an iron compound with hydrogen at temperatures not exceeding 600°C.

2. The process of claim 1 wherein the iron compound from which the catalyst is prepared is an oxide of iron.

3. The process of claim 2 wherein the oxide of iron contains a refractory oxide.

4. The process of claim 2 wherein the catalyst has been prepared by contacting the oxide of iron with hydrogen at a temperature between 250°C. and 550°C.

5. The process of claim 4 wherein the catalytic hydrogenation reaction is conducted between 105°C. and 165°C.

6. The process of claim 5 wherein the catalytic hydrogenation reaction is conducted at a pressure of about 340 atmospheres.

7. The process of claim 1 wherein the iron compound is an oxide of iron, which has been d with carbon monoxide at a temperature ranging from 250°C. to 450° C. for a time sufficient to produce substantial amounts of iron carbide, prior to contacting with hydrogen.

* * * * *

PO-1050
(5/69)

UNITED STATES PATENT OFFICE
CERTIFICATE OF CORRECTION

Patent No. 3,696,153          Dated October 3, 1972

Inventor(s) Bernard John Kershaw; Maurice George Pounder; Kenneth Ross Wilkins

It is certified that error appears in the above-identified patent and that said Letters Patent are hereby corrected as shown below:

Column 6, line 14, "catalystic" should read --catalytic--; line 36, "d" should read --treated--.

Signed and sealed this 3rd day of July 1973.

(SEAL)
Attest:

EDWARD M. FLETCHER, JR.          Rene Tegtmeyer
Attesting Officer                Acting Commissioner of Patents